(12) United States Patent
Niitsuma

(10) Patent No.: US 6,693,564 B2
(45) Date of Patent: Feb. 17, 2004

(54) NAVIGATION APPARATUS AND INTERSECTION GUIDANCE METHOD

(75) Inventor: Eiichi Niitsuma, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 10/303,674

(22) Filed: Nov. 25, 2002

(65) Prior Publication Data

US 2003/0122688 A1 Jul. 3, 2003

(30) Foreign Application Priority Data

Nov. 28, 2001 (JP) ........................... 2001-362053

(51) Int. Cl.$^7$ ............................................... G08G 1/123
(52) U.S. Cl. ............................ 340/995.2; 340/995.15; 340/995.17; 340/995.19; 340/990; 701/211; 701/212; 701/208
(58) Field of Search ..................... 340/995.2, 995.15, 340/995.17, 995.19, 990; 701/211, 212, 208

(56) References Cited

U.S. PATENT DOCUMENTS

| | | | | |
|---|---|---|---|---|
| 5,739,772 A | | 4/1998 | Nanba et al. | 340/990 |
| 5,874,905 A | * | 2/1999 | Nanba et al. | 340/995.2 |
| 5,938,718 A | | 8/1999 | Morimoto et al. | 701/201 |
| 6,064,941 A | * | 5/2000 | Nimura et al. | 701/210 |

* cited by examiner

*Primary Examiner*—Daniel J. Wu
*Assistant Examiner*—Tai T. Nguyen
(74) *Attorney, Agent, or Firm*—Brinks Hofer Gilson & Lione

(57) ABSTRACT

Monitoring is performed to determine whether or not the vehicle approaches a first point in a road where the vehicle turns right before a no-left-turn intersection for effectively entering and turning left at the no-left-turn intersection. When it is determined that the vehicle is close to the first point in the road, the direction in which the vehicle should travel from the first point in the road to a second point beyond the no-left-turn intersection is continuously indicated by an arrow in one enlarged view of the intersection.

14 Claims, 10 Drawing Sheets

FIG. 5

| NODE | LONGITUDE AND LATITUDE | INTERSECTION FLAG |
|---|---|---|
| STARTING POINT (NODE NO.) | | |
| NODE N1 | | |
| NODE N2 | | |
| ⋮ | ⋮ | ⋮ |
| DESTINATION (NODE Ne) | | |

NAVIGATION APPARATUS AND INTERSECTION GUIDANCE METHOD

BACKGROUND OF THE INVENTION

1. Field of the Invention

The present invention relates to a navigation apparatus and an intersection-guidance method. More particularly, the present invention relates to a navigation apparatus and an intersection-guidance method for displaying a guidance route on a map and for displaying an enlarged view of an intersection on the guidance route for indicating the direction in which a vehicle should travel at the intersection when the vehicle approaches the intersection.

2. Description of the Related Art

In the past, a navigation apparatus detects the position of a vehicle and reads map data for the area around the vehicle position from a map-information recording medium such as a CD-ROM, a DVD, and so forth. Then, the navigation apparatus draws and displays a map image on a display-screen and draws and displays a mark indicating the vehicle at a predetermined position on the map image. As the vehicle travels, the navigation apparatus changes the position of the vehicle mark according to the change in the current position of the vehicle. In another case, the vehicle mark is fixed at a predetermined position on the display-screen, such as the center. Then, by scrolling the map image, it becomes possible to easily understand the map data for the area around the vehicle position at all times. Such a navigation apparatus has a route-guidance function. Therefore, the navigation apparatus can search for a route that leads from a start-point to a destination in the shortest time or by the shortest distance, and can display such a route on the display screen for guiding the driver of the vehicle to the destination. With the route-guidance function, when the vehicle approaches an intersection, an enlarged view of the intersection is displayed for indicating the direction in which the vehicle should travel at the intersection. Further, voice guidance is used for informing the driver of the travel direction to prevent the driver from going in the wrong direction at the intersection.

In the past, the enlarged view of the intersection is generated with reference to a road attribute that is stored in a map database for informing the driver of the traveling direction. However, such a road attribute does not include attributes of an intersection with a peculiar shape such as that shown in FIG. 9A, which is a Spanish left-turn intersection which is common in Latin countries such as Spain, Portugal, and so forth. Also, the road attribute does not include attributes of an intersection with a peculiar shape such as that shown in FIG. 10A, which is a Michigan left-turn intersection commonly found in the State of Michigan, U.S.A.

According to the road attribute of the Spanish left-turn intersection in FIG. 9A, the vehicle turns right at a branch intersection BRC before a no-left-turn intersection LTIC and enters the no-left-turn intersection LTIC as shown by a guidance route IRD. In this manner, the vehicle effectively can turn left at the no-left-turn intersection LTIC.

According to the road attribute of the Michigan left-turn intersection in FIG. 10A, the vehicle turns right at a branch intersection BRC before a no-left-turn intersection LTIC, turns left at a road RD, and travels straight ahead at the no-left-turn intersection LTIC, as shown by a guidance route IRD. In this manner, the vehicle effectively can turn left at the no-left-turn intersection LTIC.

Usually, existing map databases such as the above-described map database give an indescribable-attribute (an attribute that is untrustworthy or unreliable) to a turning link LK (indicated by arrow GA) of the Spanish left-turn intersection. However, it is unclear whether or not all the intersections have such an attribute. Further, the Spanish left-turn is not clearly defined in the specifications of such map databases. Therefore, two kinds of maneuver displays, that is, MN1 and MN2 shown in FIG. 9B are shown on one screen for illustrating the enlarged view of the Spanish left-turn intersection. MN1 shows an arrow pointing in a direction for guiding the vehicle to turn obliquely right. On the other hand, MN2 shows an arrow pointing in a direction for guiding the vehicle to turn obliquely left. In the case of the Michigan left-turn intersection, two kinds of maneuver displays, that is, MN1' and MN2' shown in FIG. 10B are shown on one screen for illustrating the enlarged view of the Michigan left-turn intersection. MN1' shows an arrow pointing in a direction for guiding the vehicle to turn obliquely right. MN2' shows an arrow pointing in a direction for guiding the vehicle to turn left. In each of FIGS. 9B and 10B, the two maneuver displays are shown on one screen. This is because the distance between the intersections is short (less than 150 meters). If the distance is 150 meters or more, the two maneuver displays are shown on separate screens in order.

Thus, in the past, when the driver is close to the Spanish left-turn intersection or the Michigan left-turn intersection, the driver is first guided to turn right at the intersection by the enlarged view of the intersection where the driver should be guided to turn left. Therefore, the driver is confused by such guidance.

SUMMARY OF THE INVENTION

Accordingly, it is an object of the present invention to display an enlarged view of an intersection appropriately without confusing a driver when the road attribute of the intersection is a Spanish left-turn or a Michigan left-turn.

According to an intersection-guidance method of the present invention, monitoring is performed to determine whether or not the vehicle is close to a first point in a road where the vehicle turns right before a no-left-turn intersection for entering and turning left at the no-left-turn intersection. When the vehicle is close to the first point in the road, the direction in which the vehicle should travel from the first point in the road to a second point beyond the no-left-turn intersection is continuously indicated by an arrow in one enlarged view of the intersection. Subsequently, the display of the enlarged view of the intersection can be shown appropriately without confusing the driver when the road attribute of the intersection is a Spanish left-turn or a Michigan left-turn. That is to say, because the driver is informed of the correct path in which he/she should travel, he/she is prevented from going in a wrong direction.

Preferably, the first point in the road is a start-point node of two or more exit links when an end-point node of at least one of the exit links not forming the guidance route exists on the guidance route. For showing a display of an enlarged view of an intersection that can be used for either a Spanish left-turn intersection or a Michigan left-turn intersection, a vehicle approaching the first point in the road (a branch intersection) may be detected. Then, the direction in which the vehicle should travel from the first point in the road to a second point beyond the no-left-turn intersection may be continuously indicated by an arrow in one enlarged view of the intersection. Subsequently, the display of the enlarged view of the intersection can be shown appropriately without confusing the driver.

Preferably, the first point in the road is a start-point node of two or more exit links when two of the exit links have the same end-point node and when one of the two exit links forms the guidance route. For showing a display of an enlarged view of an intersection that can be used for a Spanish left-turn intersection, a vehicle approaching the first point in the road (a branch intersection) may be detected. Then, the direction in which the vehicle should travel from the first point in the road to the second point beyond the no-left-turn intersection may be continuously indicated by an arrow in one enlarged view of the intersection. Subsequently, the display of the enlarged view of the intersection can be shown appropriately without confusing the driver.

Preferably, the first point in the road is a start-point node of two or more exit links when an end-point node of at least one of the exit links not forming the guidance route exists on the guidance route and when the guidance route passes through the end-point node in a straight line. For performing a display of an enlarged view of an intersection that can be used for a Michigan left-turn intersection, a vehicle approaching the first point in the road (a branch intersection) may be detected. Then, the direction in which the vehicle should travel from the first point in the road to the second point beyond the no-left-turn intersection may be continuously indicated by an arrow in one enlarged view of the intersection. Subsequently, the display of the enlarged view of the intersection can be shown appropriately without confusing the driver.

BRIEF DESCRIPTION OF THE DRAWINGS

FIG. 5 illustrates guidance route information;

DESCRIPTION OF THE PREFERRED EMBODIMENTS (A) Brief Description of the Invention Each of FIGS. 1A to 1C generally illustrates an enlarged view of a Spanish left-turn intersection that is displayed according to the present invention. In particular, FIGS. 1A and 1B are schematic diagrams where the periphery of the Spanish left-turn intersection is illustrated by links and nodes. Arrows in FIGS. 1A and 1B represent a guidance route.

Figure 1A:
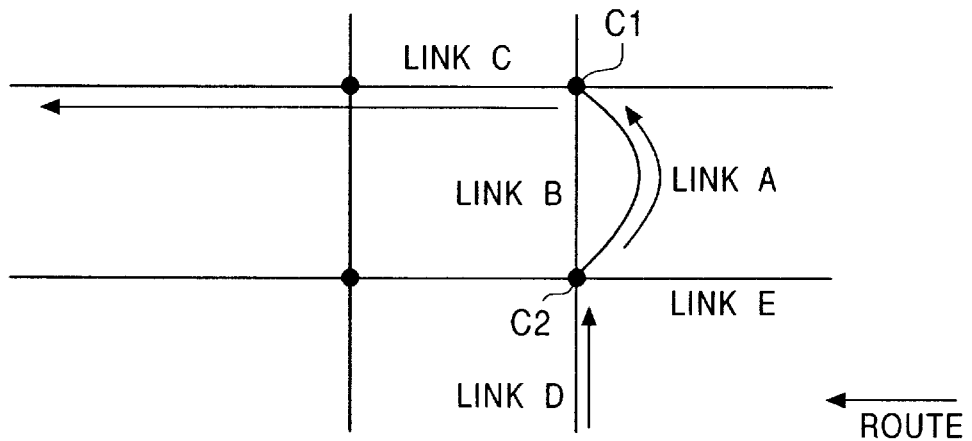
FIG. 1A illustrates an enlarged view of a Spanish left-turn intersection that is displayed according to the present invention.
Figure 1B:
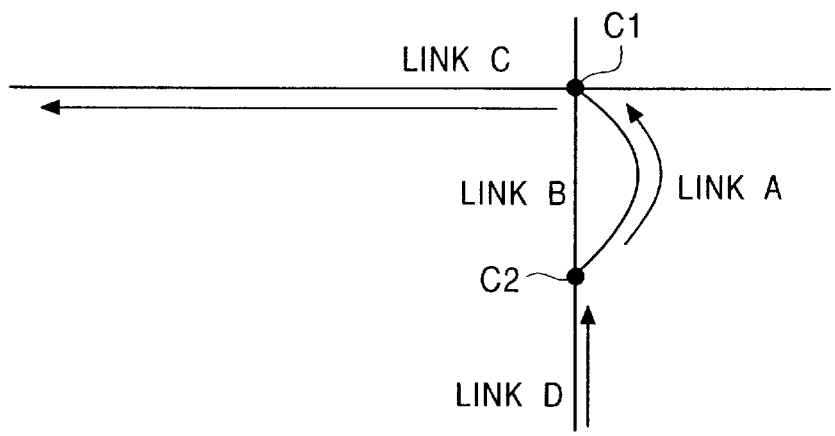
FIG. 1B illustrates another enlarged view of the Spanish left-turn intersection that is displayed according to the present invention.

Spanish left-turn refers to a road attribute in which a vehicle or the like is allowed to turn left at an intersection where left turns are prohibited. That is to say, as shown in the above-described drawings, the vehicle first turns right at a branch intersection C2 before a no-left-turn intersection C1 and then enters the no-left-turn intersection C1. In this manner, the vehicle effectively can turn left at the no-left-turn intersection C1. The branch intersection C2 is the start-point node of two or more exit links (exit links A, B, and E in FIG. 1A, and exit links A and B in FIG. 1B). The end-point node of the exit link A is the same as that of the exit link B. Here, the exit link A forms a guidance route.

Figure 1C:
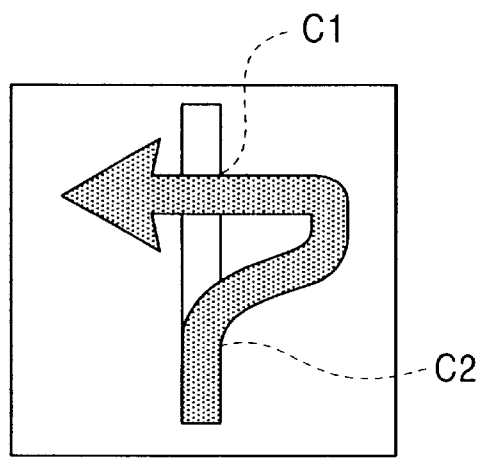
FIG. 1C illustrates another enlarged view of the Spanish left-turn intersection that is displayed according to the present invention.

When the vehicle approaches such a Spanish left-turn intersection, another enlarged view of the intersection is displayed as shown in FIG. 1C. As shown in the drawing, the direction in which the vehicle travels from the branch intersection C2 to a position beyond the no-left-turn intersection C1 is continuously illustrated by an arrow in one enlarged view of the intersection.

Figure 2A:
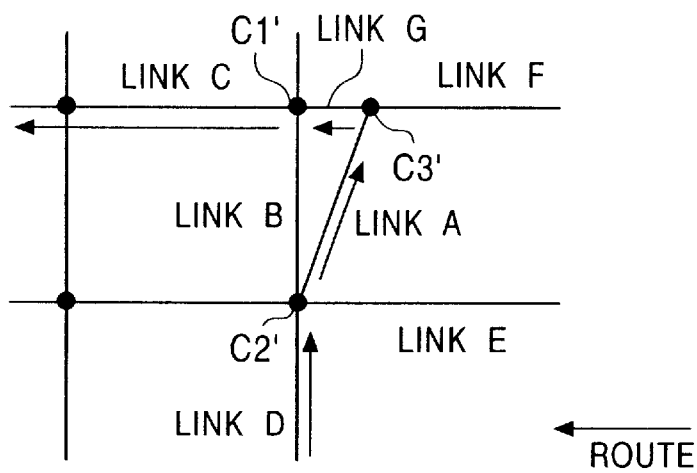
FIG. 2A illustrates an enlarged view of a Michigan left-turn intersection that is displayed according to the present invention.
Figure 2B:
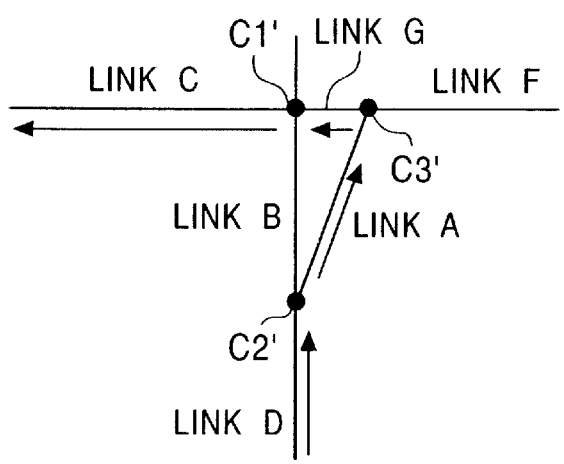
FIG. 2B illustrates another enlarged view of the Michigan left-turn intersection that is displayed according to the present invention.
Figure 2C:
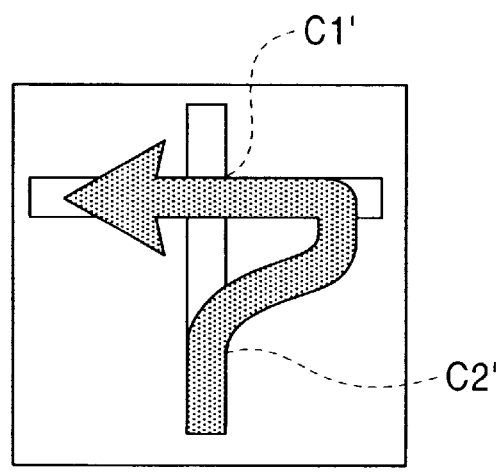
FIG. 2C illustrates another enlarged view of the Michigan left-turn intersection that is displayed according to the present invention.

Each of FIGS. 2A to 2C generally illustrates an enlarged view of a Michigan left-turn intersection that is displayed according to the present invention. In particular, FIGS. 2A and 2B are schematic diagrams where the periphery of the Michigan left-turn intersection is illustrated by links and nodes. Arrows in FIGS. 12A and 2B represent a guidance route.

The Michigan left-turn refers to a road attribute in which a vehicle or the like is allowed to turn left at an intersection where left turns are prohibited. That is to say, as shown in the above-described drawings, the vehicle turns right at a branch intersection C2' before a no-left-turn intersection C1' and travels straight ahead at the no-left-turn intersection C1'. In this manner, the vehicle effectively can turn left at the no-left-turn intersection C1'. The branch intersection C2' is the start-point node of two or more exit links (exit links A, B, and E in FIG. 2A, and exit links A and B in FIG. 2B). Here, the exit link A forms a guidance route. In such a case, at least one of the exit links does not form the guidance route and has an end-point node on the guidance route. Further, the guidance route passes the end-point node straight ahead.

When the vehicle approaches such a Michigan left-turn intersection, another enlarged view of the intersection is displayed as shown in FIG. 2C. In this view, the direction in which the vehicle travels from the branch intersection C2' to a position beyond the no-left-turn intersection C1' is continuously illustrated by an arrow.

Figure 3:
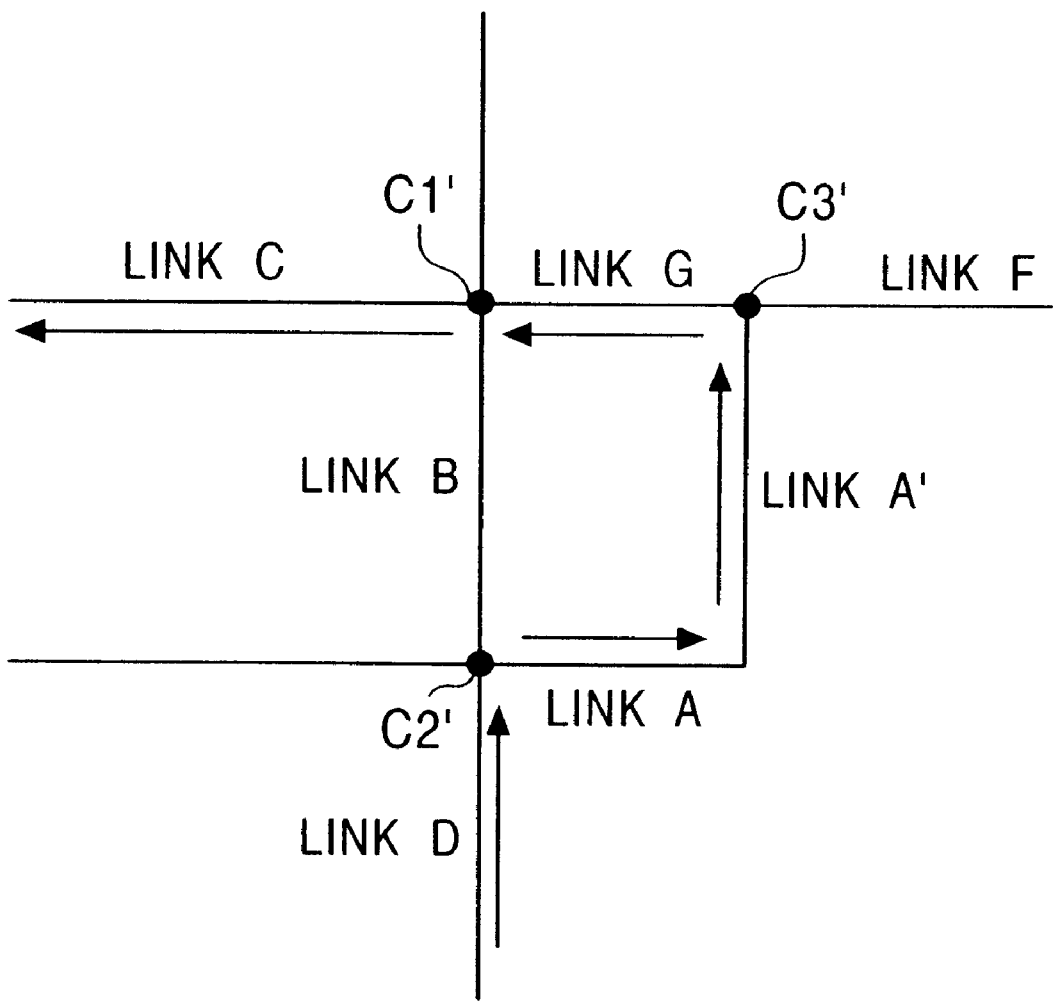
FIG. 3 illustrates another typical Michigan left-turn intersection.

FIG. 3 illustrates another typical Michigan left-turn intersection. As shown in the drawing, the vehicle can turn right at a branch intersection C2' before a no-left-turn intersection C1' by following a U-shaped path. Further, the vehicle travels straight ahead at the no-left-turn intersection C1'. In this manner, the vehicle effectively can turn left at the no-left-turn intersection C1'. Here, the length of the exit link A is 10 to 20 meters.

(B) Navigation Apparatus

Figure 4:
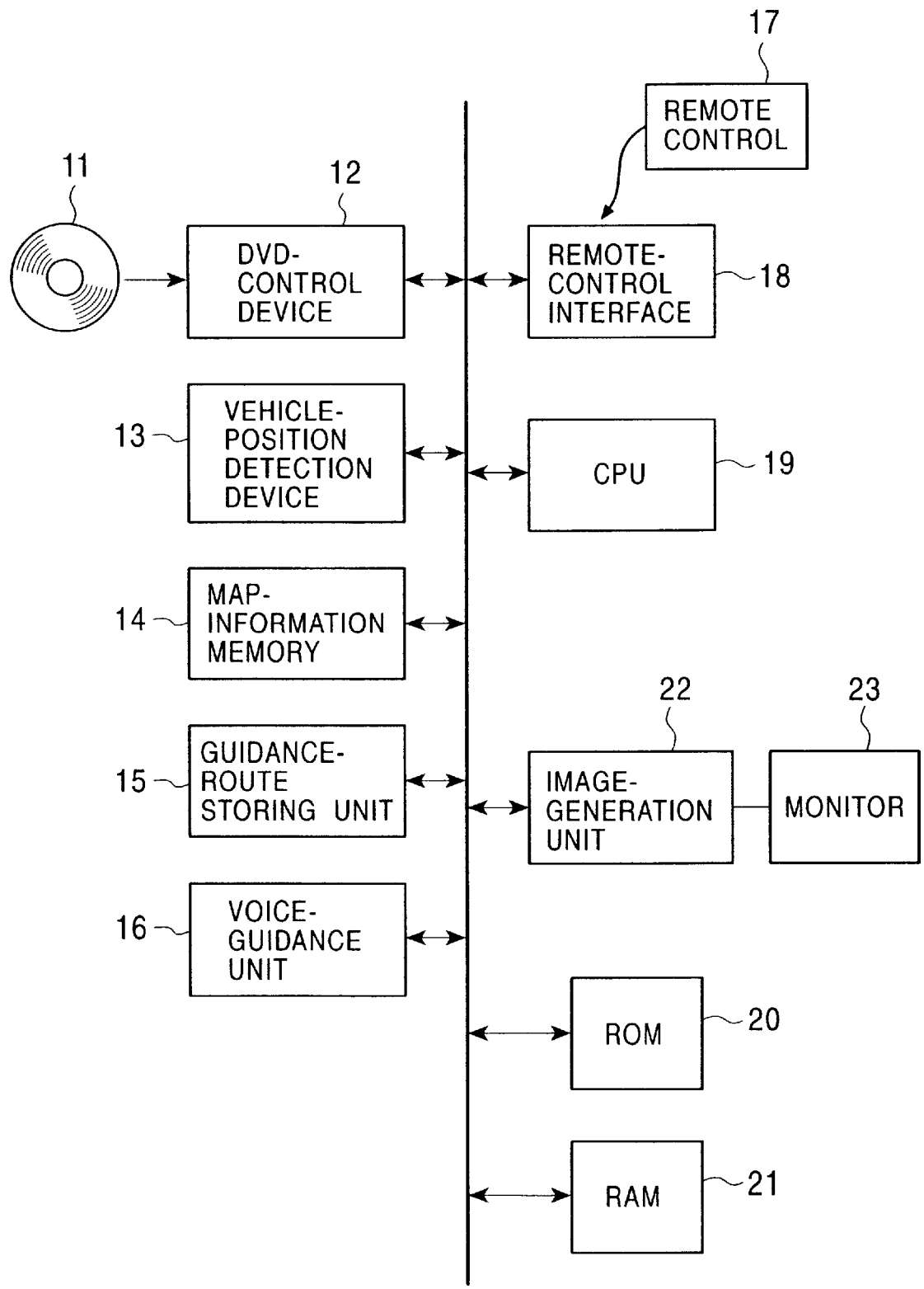
FIG. 4 illustrates the general configuration of a navigation apparatus according to the present invention.

FIG. 4 illustrates the general configuration of a navigation apparatus according to the present invention. Reference numeral 11 indicates a DVD serving as a recording medium for storing map information, and reference numeral 12 indicates a DVD-control device for reading predetermined map information from the DVD 11. Reference numeral 13 indicates a vehicle-position detection device for detecting the position of the vehicle. Reference numeral 14 indicates a map-information memory for storing the map information read from the DVD 11. Reference numeral 15 indicates a guidance-route storing unit for storing information about a guidance route leading to a destination that is found by a search. Reference numeral 16 indicates a voice-guidance unit to announce the direction in which the vehicle should travel at an intersection. Reference numeral 17 indicates a remote control for performing input such as menu selection, map scrolling, destination searching, and so forth. Reference numeral 18 indicates a remote-control interface. Reference numeral 19 indicates a processor (a navigation-control device) for controlling the entire navigation apparatus according to the program thereof. Hereinafter, the processor 19 is referred to as a CPU 19. Reference numeral 20 indicates a ROM for storing various kinds of control programs. Reference numeral 21 indicates a RAM for storing the processing result or the like. Reference numeral 22 indicates an image-generation unit for generating a map image/guidance-route image according to map data and guidance-route data. Further, the image-generation unit 22 generates an enlarged view of an intersection, as shown in FIGS. 1C and 2C. Reference numeral 23 indicates a display monitor.

FIG. 5 is a list of nodes forming a guidance route. As shown in the drawing, the nodes from a start-point to the destination are continuously stored. Further, the longitude and latitude of each node are stored. Also, intersection flags for indicating whether or not the place corresponding to each node is an intersection are stored.

Figure 6:
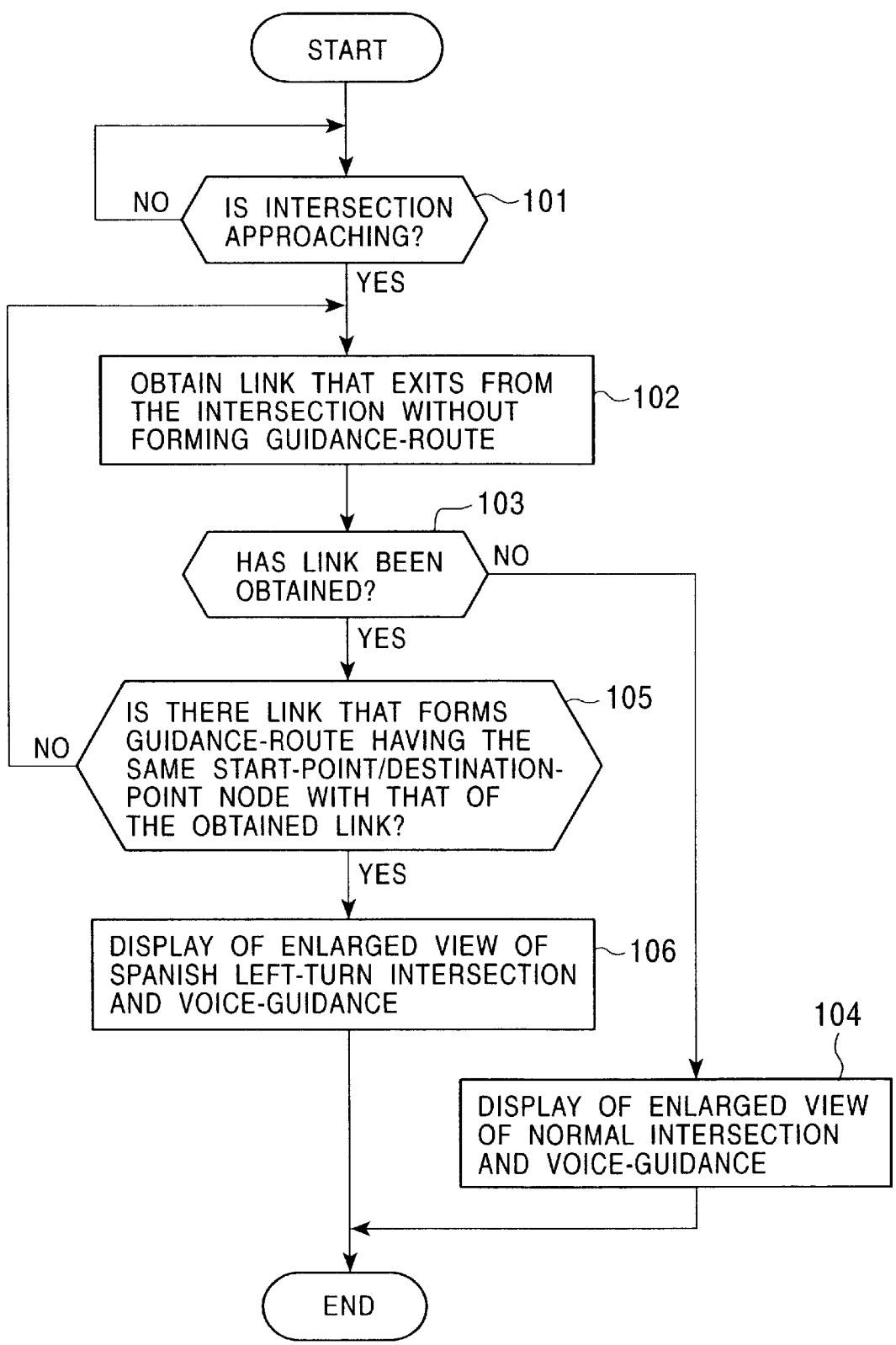
FIG. 6 is a flowchart illustrating procedures performed for displaying an enlarged view of the Spanish left-turn intersection.

(C) Procedures for Display of an Enlarged View of an Intersection (a) Display of an Enlarged View of a Spanish Left-Turn Intersection FIG. 6 is a flowchart illustrating the procedures performed for display of an enlarged view of the Spanish left-turn intersection. First, the CPU 19 monitors the vehicle to determine whether or not the vehicle is close an intersection on the guidance route at Step 101. That is to say, at Step 101, the CPU 19 determines whether or not the distance between the vehicle and the intersection is less than a predetermined value. If it is determined that the vehicle is close to the intersection, at Step 102, the CPU 19 obtains a link that functions as an exit from the intersection without forming the guidance route. Then, at Step 103, the CPU 19 checks whether or not the link, which does not form the guidance route, has been obtained. If such a link has not been obtained, the CPU 19 determines that the intersection is not a branch intersection forming the Spanish left-turn intersection. Subsequently, at Step 104, the CPU 19 controls the voice-guidance unit 16 to generate a regular voice-guidance message and controls the image-generation unit 22. Under the control of the CPU 19, a video RAM (not shown) of the image-generation unit 22 draws a regular enlarged view of the intersection. Then, the CPU 19 displays the enlarged view of the intersection on the monitor 23.

Alternately, if a link that does not form the guidance route is obtained at Step 103, the CPU 19 checks, at Step 105, whether or not a link that forms the guidance route having the same start-point node and end-point node as those of the link that does not form the guidance route exists. If such a link does not exist, the CPU 19 goes back to Step 102 and performs the processing procedure for finding another link that does not form a guidance route. The following processing procedures are performed depending on whether or not a link is obtained.

If the answer is "Yes" at Step 105, the intersection is determined to be the branch intersection forming a Spanish left-turn intersection. Therefore, at Step 106, the CPU 19 controls the voice-guidance unit 16 to generate a message "Next, first turn right and then turn left." Under the control of the CPU 19, the video RAM of the image-generation unit 22 draws an enlarged view of the intersection, as shown in FIG. 1C. Then, the CPU 19 displays the enlarged view of the intersection on the monitor 23. In the enlarged view of the intersection, the traveling direction from the branch intersection C2 to the position beyond the no-left-turn intersection C1 is continuously illustrated by an arrow.

(b) Display of an Enlarged View of a Michigan Left-Turn Intersection

Figure 7:
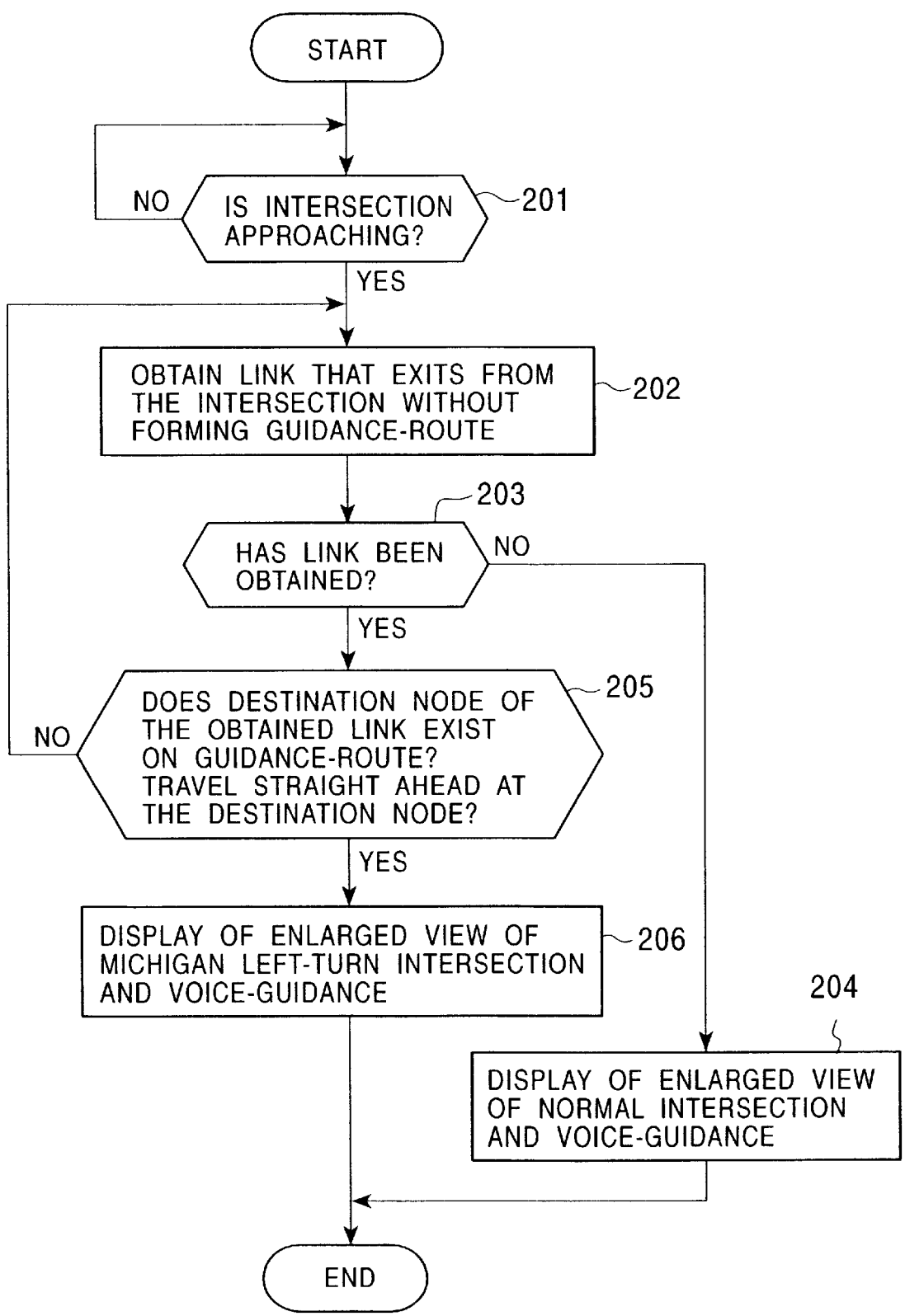
FIG. 7 is a flowchart illustrating procedures performed for displaying an enlarged view of the Michigan left-turn intersection.

FIG. 7 is a flowchart illustrating the procedures performed for displaying an enlarged view of a Michigan left-turn intersection. The procedures performed at Steps 201 to 204 are the same as those performed at Steps 101 to 104 shown in FIG. 6.

If a link that does not form the guidance route is obtained at Step 203, the CPU 19 checks whether or not an end-point node of the obtained link exists on the guidance route and whether or not the guidance route passes through the end-point node of the obtained link straight ahead at Step 205.

If the answer is "NO", the CPU 19 goes back to Step 202 and performs the procedure for finding another link that does not form the guidance route. The following processing procedures are performed depending on whether or not a link is obtained.

If the answer is "Yes" at Step 205, the intersection is determined to be a branch intersection forming a Michigan left-turn intersection. Therefore, at Step 206, the CPU 19 controls the voice-guidance unit 16 to generate a voice-guidance message for the Michigan left-turn, that is, a message "Next, first turn right and then turn left." Under the control of the CPU 19, the video RAM of the image-generation unit 22 draws an enlarged view of the intersection, as shown in FIG. 2C. Then, the CPU 19 displays the enlarged view of the intersection on the monitor 23. In the enlarged view of the intersection, the traveling direction from the branch intersection C2' to a position beyond the no-left-turn intersection C1' is continuously illustrated by an arrow.

(c) Display of an Enlarged View of a Spanish or Michigan Left-Turn Intersection

Figure 8:
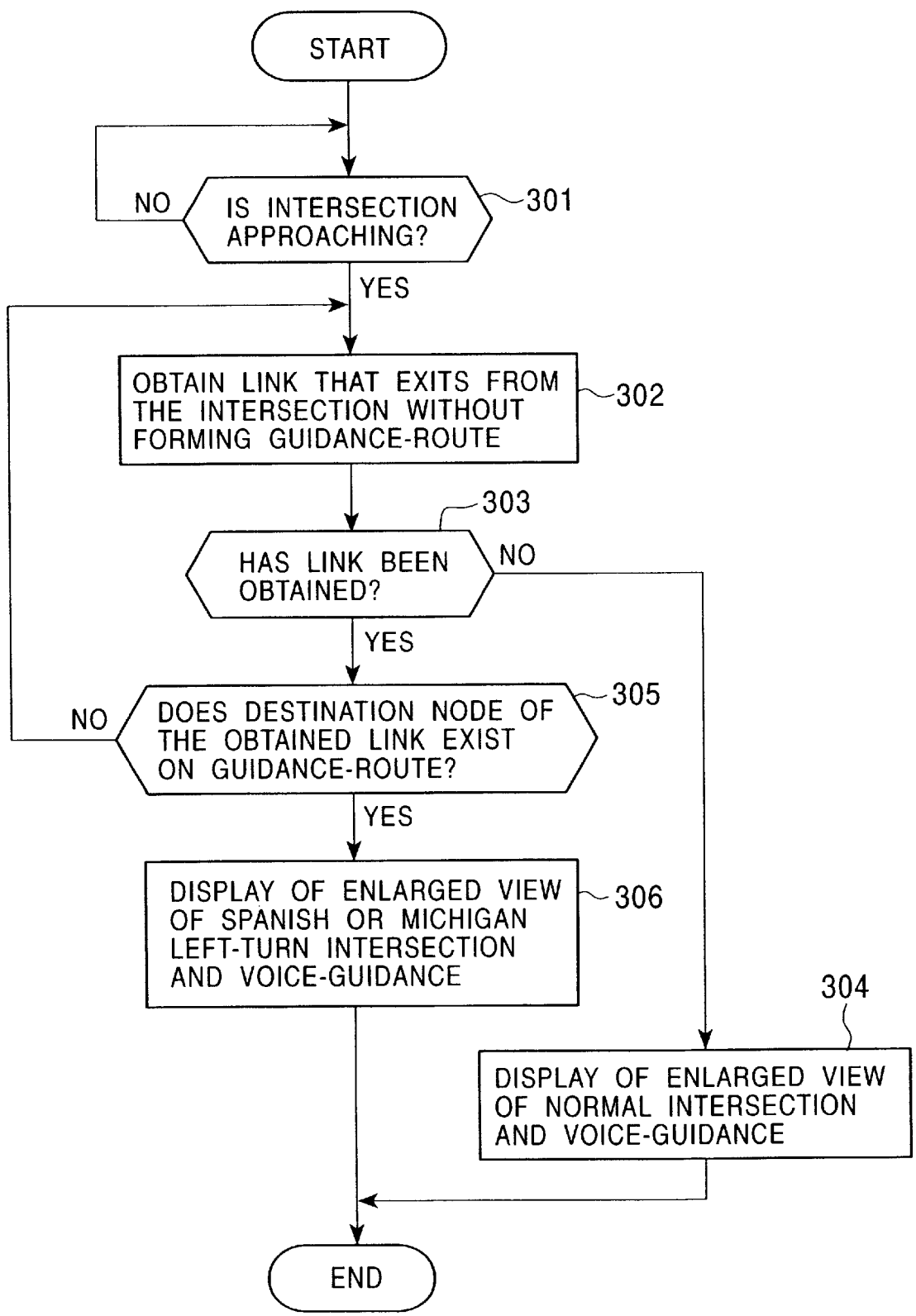
FIG. 8 is a flowchart illustrating procedures performed for displaying an enlarged view of an intersection in a case where the intersection is the Spanish left-turn intersection or the Michigan left-turn intersection.
Figure 9A:
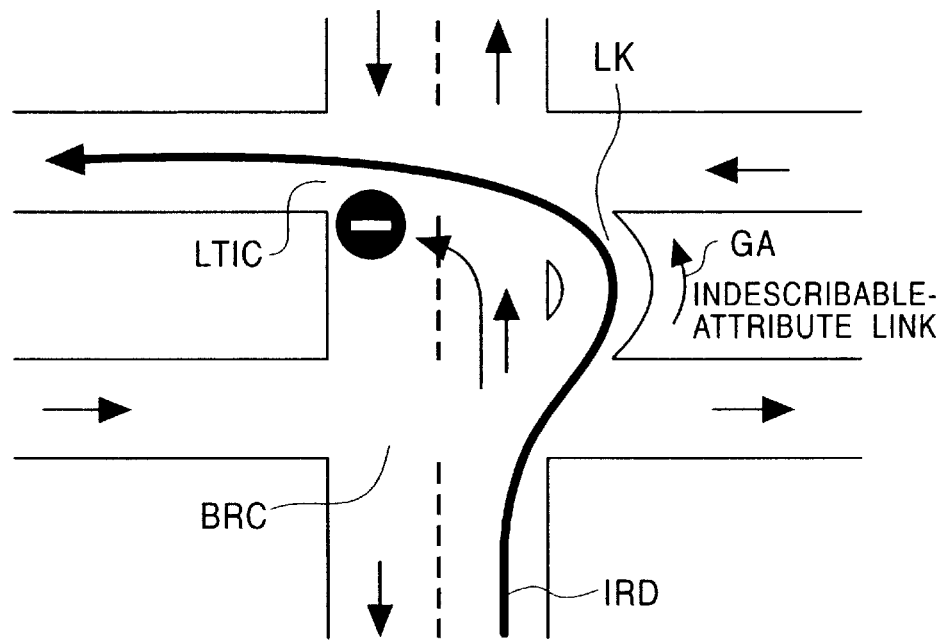
FIG. 9A illustrates the layout of the Spanish left-turn.
Figure 9B:
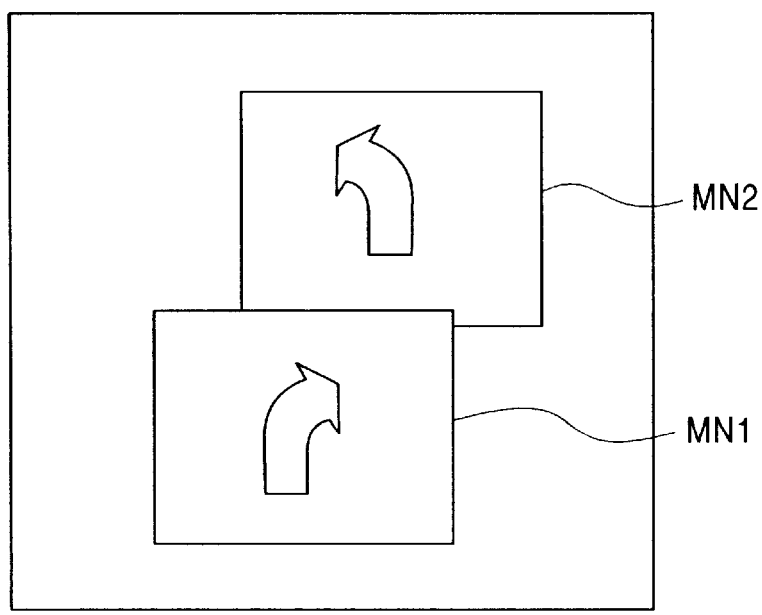
FIG. 9B is an enlarged view of the Spanish left-turn intersection in the prior art.
Figure 10A:
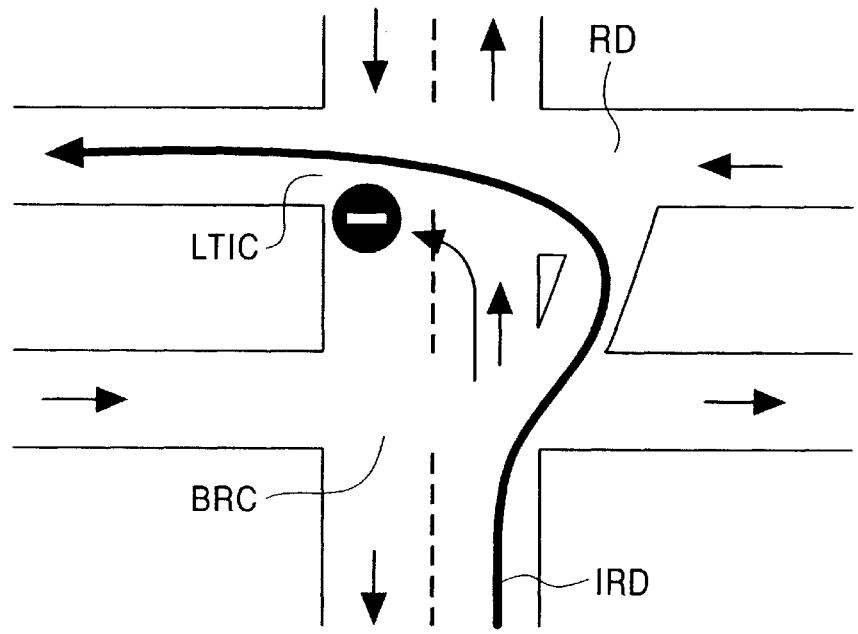
FIG. 10A illustrates the layout of the Michigan left-turn.
Figure 10B:
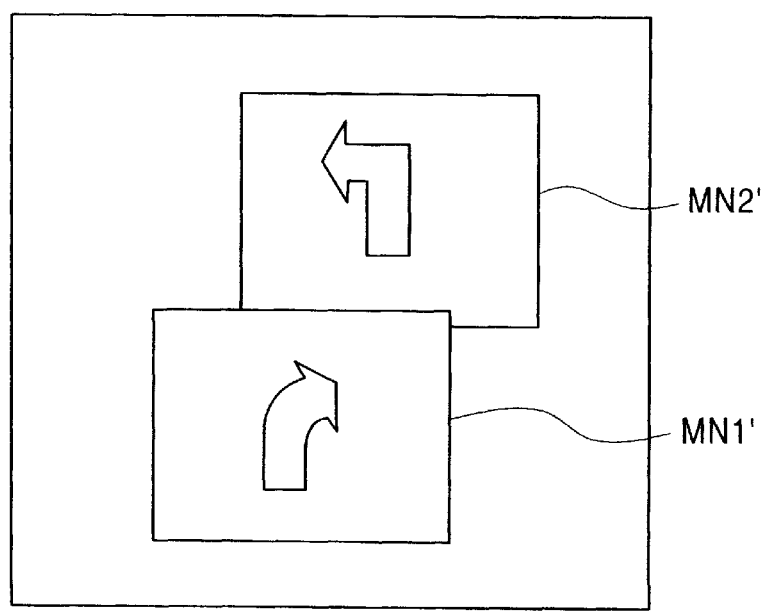
FIG. 10B is an enlarged view of the Michigan left-turn intersection in the prior art.

FIG. 8 is a flowchart illustrating the procedures performed for displaying an enlarged view of an intersection in a case where the intersection is a Spanish left-turn intersection or a Michigan left-turn intersection. The procedures performed at Steps 301 to 304 are the same as those performed at Steps 101 to 104 shown in FIG. 6.

If a link that does not form a guidance route is obtained at Step 303, the CPU 19 checks, at Step 305, whether or not an end-node of the obtained link exists on the guidance route.

If such a link does not exist, the CPU 19 goes back to Step 302 and performs the procedure for finding another link that does not form the guidance route. The following processing procedures are performed depending on whether or not a link is obtained.

If the answer is "Yes" at Step 305, the intersection is determined to be a branch intersection forming a Spanish left-turn intersection or a Michigan left-turn intersection. Therefore, at Step 306, the CPU 19 controls the voice-guidance unit 16 to generate a voice-guidance message for the Michigan left-turn/Spanish left-turn intersection, that is, a message "Next, first turn right and then turn left." Under the control of the CPU 19, the video RAM of the image-generation unit 22 draws an enlarged view of the intersection, as shown in FIG. 1C. Then, the CPU 19 displays the enlarged view of the intersection on the monitor 23.

As has been described, if an intersection has a link that does not form a guidance route and that has an end-point node existing on the guidance route, the intersection is determined to be a branch intersection forming the Spanish left-turn intersection or the Michigan left-turn intersection. However, in addition to the above-described conditions, other conditions can also be set for performing such a determination. For example, the intersection can be determined to be a branch intersection forming a Spanish left-turn intersection or a Michigan left-turn intersection if the length of the route from the point at which the vehicle turns right to the point at which the vehicle turns left is less than K-times that of the link that does not form the guidance route.

What is claimed is:

1. An intersection-guidance method using a navigation apparatus that displays a guidance route on a map and displays an enlarged view a branch intersection and a no-left-turn intersection of on the guidance route when a vehicle approaches the intersections, for indicating the direction in which the vehicle should travel at the intersections, the method comprising:
   monitoring the vehicle to determine whether or not the vehicle is close to a first point in a road where the vehicle should turn right at the branch intersection before the no-left-turn intersection for effectively entering and turning left at the no-left-turn intersection; and
   continuously indicating the direction in which the vehicle should travel from the first point in the road to a second point in the guidance route beyond the no-left-turn intersection by an arrow in one enlarged view of the intersections when the vehicle approaches the first point in the road.

2. An intersection-guidance method according to claim 1, wherein when the vehicle approaches the first point in the road where the vehicle should turn right before the no-left-turn intersection, a voice-guidance message instructs a right turn in order to allow the vehicle to effectively turn left at the no-left-turn intersection.

3. An intersection-guidance method according to claim 1, wherein the first point in the road is a start-point node of two or more exit links, and an endpoint node of at least one of the exit links not forming the guidance route exists on the guidance route.

4. An intersection-guidance method according to claim 1, wherein the first point in the road is a start-point node of two or more exit links, two of the exit links have the same end-point node, and one of the two exit links forms the guidance route.

5. An intersection-guidance method according to claim 1, wherein the first point in the road is a start-point node of two or more exit links, an end-point node of at least one of exit links not forming the guidance route exists on the guidance route, and the guidance route passes through the end-point node in a straight line.

6. An intersection-guidance method according to claim 5, wherein the length of a route for turning right between the start-point node and the end-point node on the guidance route is less than a predetermined multiple of the length of a route between the start point node and the end point node that does not form the guidance route.

7. An intersection-guidance method according to claim 1, wherein the first point in the road is a branch intersection of a Michigan left-turn.

8. A navigation apparatus that displays a guidance route on a map and that displays an enlarged view of a branch intersection and a no-left-turn intersection on the guidance route when a vehicle is close to the branch intersection, for indicating the direction in which the vehicle should travel at the no-left-turn intersection, comprising:
   a vehicle-position detection unit for detecting the position of the vehicle;
   a monitor for monitoring the vehicle to determine whether or not the vehicle is close to a first point in a road where the vehicle should turn right at the branch intersection before the no-left-turn intersection for effectively entering and turning left at the no-left-turn intersection;
   drawing means for drawing the enlarged view of the intersections for continuously indicating the direction in which the vehicle should travel from the first point in the road to a second point beyond the no-left-turn intersection when the vehicle is close to the first point in the road; and
   a display for displaying the enlarged view of the intersections.

9. A navigation apparatus according to claim 8, further comprising a voice-guidance unit for generating a message that instructs a right turn when the vehicle is close to the first point in the road in order to allow the vehicle to effectively enter and turn left at the no-left-turn intersection.

10. A navigation apparatus according to claim 8, wherein the first point in the road is a branch intersection of a Michigan left-turn.

11. A navigation apparatus according to claim 8, wherein the first point in the road is a start-point node of two or more exit links, and an end-point node of at least one of the exit links not forming the guidance route exists on the guidance route.

12. A navigation apparatus according to claim 8, wherein the first point in the road is a start-point node of two or more exit links, two of the exit links have the same end-point node, and one of the two exit links forms the guidance route.

13. A navigation apparatus according to claim 8, wherein the first point in the road is a start-point node of two or more exit links, an end-point node of at least one of the exit links not forming the guidance route exists on the guidance route, and the guidance route passes through the end-point node in a straight line.

14. A navigation apparatus according to claim 13, wherein the length of a route for turning right between the start-point node and the end-point node on the guidance route is less than a predetermined multiple of the length of a route between the start point node and the end point node that does not form the guidance route.

* * * * *